May 17, 1955   F. J. KUHN   2,708,349
FROZEN FOOD CABINET

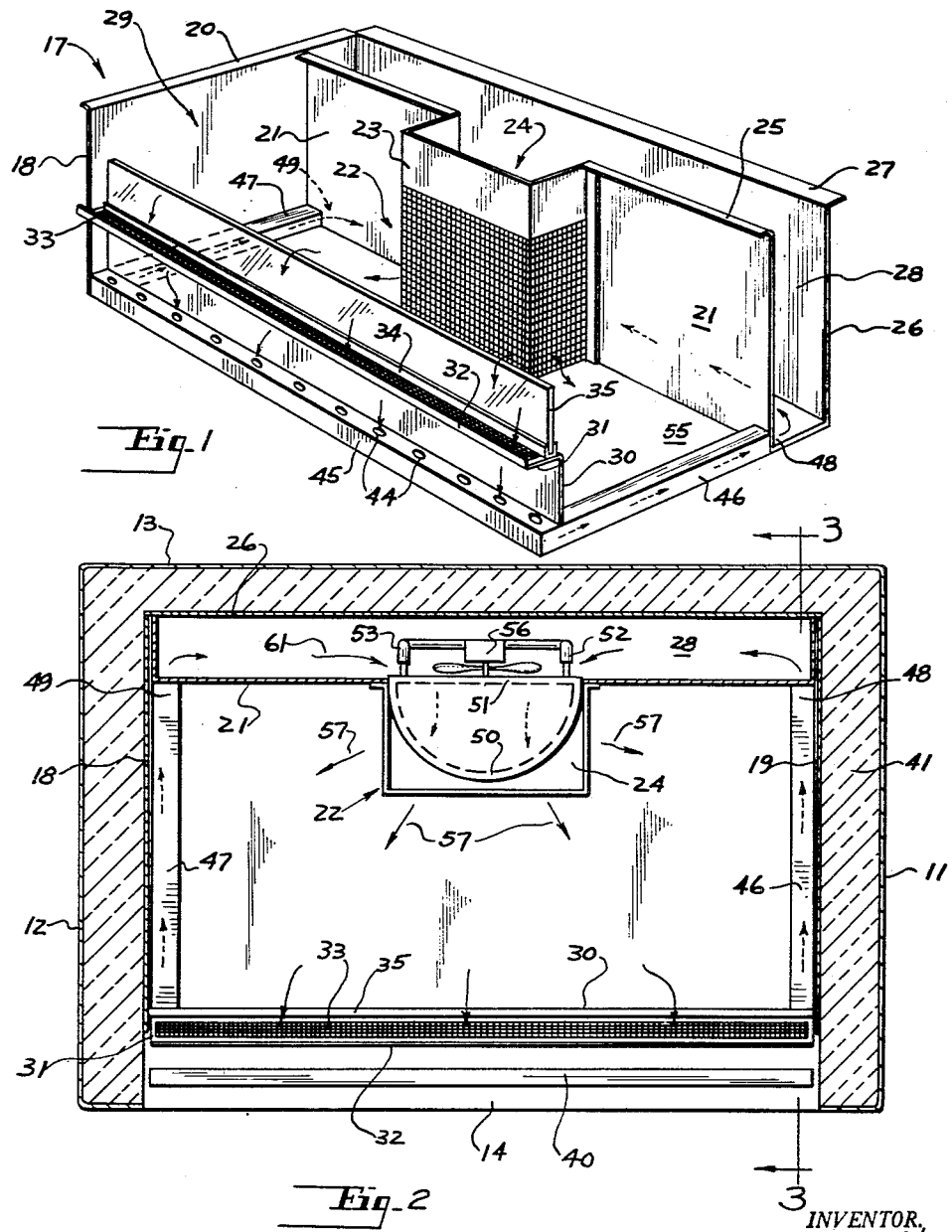

Filed Nov. 19, 1953   2 Sheets-Sheet 2

INVENTOR.
FRED J. KUHN.
BY Robert G. Sloman
ATTORNEY.

2,708,349

FROZEN FOOD CABINET

Fred J. Kuhn, Detroit, Mich.

Application November 19, 1953, Serial No. 393,039

8 Claims. (Cl. 62—89.5)

This invention relates to a frozen food cabinet, and more particularly to such a cabinet together with means for circulating the air in the storage compartment.

It is the object of the present invention to provide a hollow insulated food storage box including a refrigerating device and blower means for circulating air throughout the interior of the food storage compartment, through certain return air compartments and air ducts for recirculation.

It is the further object of the present invention to provide for the continuous movement of air past the refrigerator coil within the frozen food cabinet.

These and other objects will be seen from the following specification and claims in conjunction with the appended drawings, in which:

Fig. 1 is a fragmentary perspective view of the liner construction for the frozen food cabinet.

Fig. 2 is a plan section of the cabinet taken on line 2—2 of Fig. 3.

Figures 3, 4:
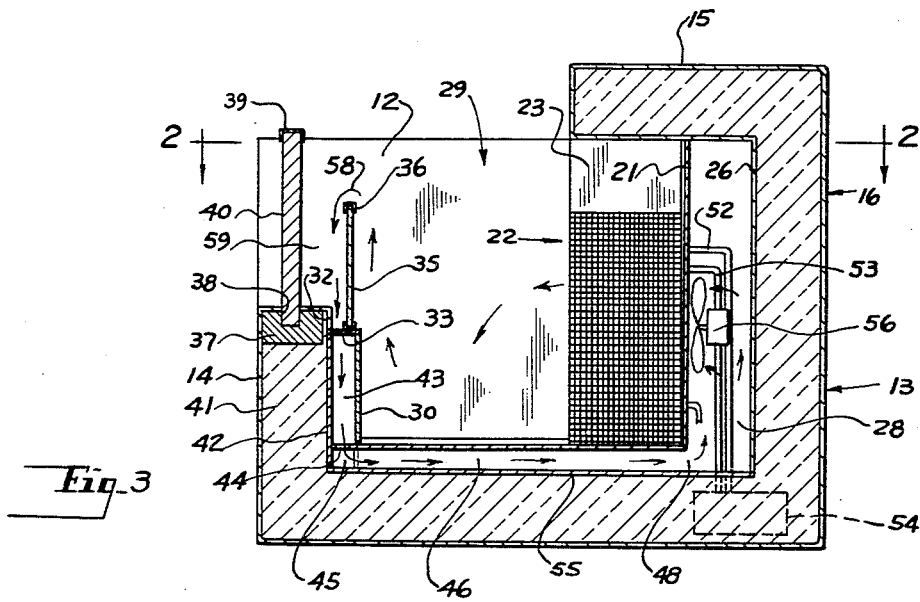
Fig. 3 is a section taken on line 3—3 of Fig. 2.
Fig. 4 is a perspective view of the present cabinet.

It will be understood that the above drawings illustrate merely a preferred embodiment of the invention, and that other embodiments are contemplated within the scope of the claims hereafter set forth.

Referring to the drawings, the present frozen food cabinet is a hollow rectangularly shaped box as in Fig. 4 with a partially open top permitting access to foods stored therein.

The box includes the hollow insulated end walls 11 and 12, rear wall 13, and front wall 14, and the hollow insulated canopy 15 over a portion of the top of the box. The walls of the cabinet include a thin metallic outer shell 16, and spaced inwardly thereof is a metallic liner, generally indicated at 17 in Fig. 1.

The liner includes the upright end walls 18 and 19 outwardly flanged at their upper ends at 20. There is provided an upright elongated rear wall 26 horizontally flanged outwardly at 27 at its upper end; and spaced inwardly thereof in parallel relation are the upright partition elements 21, whose inner ends terminate in the forwardly projecting screened housing 22, the upper portion of which is solid as at 23 and which provides an upright rectangular space 24 for housing a set of refrigerator coils 50—51 connected by conduits 52 and 53 to a suitable refrigerating mechanism, diagrammatically indicated at 54 in Fig. 3.

The partition elements 21 are flanged forwardly at their upper ends as at 25, and upon the flanges 25 and 27 rest portions of the hollow insulated canopy 15 closing off the upper end of the screened housing 22—23.

Partition elements 21 with rear wall 26 define the upright air return chamber 28, which is co-extensive with the rear wall 13 of the present cabinet.

The liner includes the bottom wall 55 and the upwardly projecting partition element 30, which is parallel to and arranged rearwardly of the front wall 14 and the inner wall element 42, which defines a portion of said front wall 14. Partition element 30 extends horizontally outward defining the horizontal ledge 31, which has an upturned flange 32 at its outer end as at Fig. 1. The ledge 31 has a screened opening 33 therein, and inwardly of said screened opening is secured the channel 34 within which is mounted in upright position the rectangularly shaped glass pane 35.

Protective moulding 36 is positioned across the upper longitudinal edge of pane 35.

Front wall 14 along its top horizontal edge has a platform element 37 with a longitudinal groove 38 therein adapted to cooperatively and supportably receive the lower longitudinal edge of the second glass pane 40 provided with protective molding 39.

A first return air chamber 28 was provided within the cabinet between partitions 21 and rear wall element 26. A second return air chamber 59 is provided along the forward end of the cabinet and is bounded upon one side by the inner surface of the thermopane 40 and therebelow the inner wall element 42 of the front wall 14 of the cabinet. Said return air chamber is further defined by the upright partition 30 within the cabinet and thereabove the upright horizontally extending glass pane 35. While the first return air chamber is bounded by the canopy 15 and bottom wall 55, the second return air chamber 59 is only bounded at its lower end by said bottom wall.

The upper end of the second return air chamber 59 is in communication with the interior or storage compartment 29 of said cabinet, inasmuch as the upper longitudinal edge of glass pane 35 is below the upper edges of side walls 11 and 12.

A suitable insulating medium 41 is provided for each of the various walls of the cabinet and the canopy 15.

As shown in Figs. 2 and 3, the ledge 31 with the screened opening 33 horizontally bridges partition 30 and the inner wall element 42 to define the compartment 43 at the lower end of the second return air chamber.

Arranged along the interior surface of front wall element 42 is a horizontally extending air duct 45 upon the bottom wall 55 of said cabinet, which extends between side walls 11 and 12, has in its upper surface a series of longitudinally spaced apertures 44 establishing communication from chamber 43 to the interior of duct 45.

There are also provided a pair of parallel spaced transverse air ducts 46 and 47 upon bottom wall 55 along the interior of said end walls with their respective front ends communicating with elongated duct 45, as shown in Fig. 3. The respective rear ends of ducts 46 and 47 are in communication with the lower end of the first return air chamber 28 at its opposite ends, as at 48 and 49 in Fig. 2.

A suitable electric fan 56 is positioned within chamber 28 rearwardly of the set of coils 50—51 within screened housing 22, whereby with the refrigerating unit 54 energized cooling the coils 50—51, and with the fan turned on, air from chamber 28 will be drawn into housing 22, past the refrigerated coils 50—51 and out through the screened portion of housing 22 as indicated by the arrows 57. This air will circulate throughout the interior of storage compartment 29, and towards its forward end will pass as indicated by arrows 58, into the upper end of the second return air chamber 59. This air will pass downwardly through the screen 33 into chamber 43 and thence into duct 45. This returned air will then divide with substantially equal portions flowing as indicated by the arrows rearwardly through the communicating side wall ducts 46 and 47 for delivery to the first return air duct 28.

By this construction, the air may be continuously circulated within the storage compartment, and recooled as it passes through the screened housing 22—24. This construction provides for an even distribution of cold within the storage cabinet, so that the food packages stored therein are maintained in a frozen condition.

Having described my invention, reference should now be had to the claims which follow for determining the scope thereof.

I claim:

1. A frozen food cabinet comprising a hollow rectangularly shaped box with a partially open top, including hollow insulated front, rear, end and bottom walls and a canopy defining a storage compartment, an upright partition parallel to and forward of said rear wall defining an upright return air chamber bounded by said canopy and bottom wall, an upright screened housing communicating with said chamber and projected forwardly thereof centrally of said compartment and bounded by said bottom wall and canopy, a refrigeration coil within said housing, a blower fan in said chamber rearwardly of said coil, an upright partition parallel to and rearwardly of said front wall defining a second return air chamber bounded by said bottom wall and communicating at its upper end with the interior of said compartment, and a pair of parallel spaced air ducts upon said bottom wall along the interior of said end walls with the respective front ends of said ducts communicating with said second return air chamber at its opposite ends, and with the rear ends of said ducts communicating with said first return air chamber at its opposite ends.

2. The cabinet of claim 1, said refrigerator coil including a series of semi-circularly shaped vertically spaced coil elements in the path of propelled air from said first return air chamber.

3. The cabinet of claim 1, the top of said front wall being spaced below the top of said side walls, and an elongated rectangular glass pane mounted on said front wall between said end walls, said pane with the interior face of said front wall defining the outer wall of said second return air chamber.

4. The cabinet of claim 1, said upright partition adjacent said front wall including an upright glass pane interposed between said side walls, the upper longitudinal edge of said plane being below the top of said side walls establishing communication of said second return air chamber with the interior of said storage compartment.

5. The cabinet of claim 1, the top of said front wall being spaced below the top of said side walls, an elongated rectangular glass pane mounted on said front wall between said end walls, said pane with the interior face of said front wall defining the outer wall of said second return air chamber, said upright partition adjacent said front wall including an upright glass pane interposed between said side walls, the upper longitudinal edge of said pane being below the top of said side walls establishing communication of said second return air chamber with the interior of said storage compartment.

6. The cabinet of claim 1, and a horizontally arranged screen bridging said second return air chamber intermediate its upper and lower ends.

7. The cabinet of claim 1, and an elongated horizontally arranged air duct upon said bottom wall along the bottom of said second return air chamber, with a plurality of air inlet apertures formed in its top surface, the opposite ends of said elongated duct respectively communicating with the front ends of said side wall ducts.

8. A frozen food cabinet comprising a hollow rectangularly shaped box with a partially open top, including hollow insulated front, rear, end and bottom walls and a canopy defining a storage compartment, an upright partition parallel to and forward of said rear wall defining an upright return air chamber bounded by said canopy and bottom wall, an upright screened housing communicating with said chamber and projected forwardly thereof centrally of said compartment and bounded by said bottom wall and canopy, a refrigeration coil within said housing, a blower fan in said chamber rearwardly of said coil, an upright partition parallel to and rearwardly of said front wall defining a second return air chamber bounded by said bottom wall and communicating at its upper end with the interior of said compartment, and an air duct upon said bottom wall with its front end communicating with said second return air chamber, and with its rear end communicating with said first return air chamber, said upright partition adjacent said front wall including an upright glass pane interposed between said side walls, the upper longitudinal edge of said pane being below the top of said side walls establishing communication of said second return air chamber with the interior of said storage compartment.

References Cited in the file of this patent
UNITED STATES PATENTS

| 2,463,614 | Hardin | Mar. 8, 1949 |
| 2,492,695 | Henderson | Dec. 27, 1949 |